US012654598B2

(12) United States Patent
Kim et al.

(10) Patent No.: US 12,654,598 B2
(45) Date of Patent: Jun. 16, 2026

(54) DEVICE FOR HEIGHT ADJUSTMENT AND SWIVEL OF VEHICLE SEAT

(71) Applicants: Hyundai Motor Company, Seoul (KR); Kia Corporation, Seoul (KR); DAS CO., LTD, Gyeongju (KR)

(72) Inventors: Ji Hwan Kim, Seoul (KR); Byung Yong Choi, Hwaseong (KR); So Young Yoo, Suwon (KR); Sang Uk Yu, Seoul (KR); Sang Ho Kim, Incheon (KR); Dong Woo Kim, Seoul (KR); Young Joon Kim, Suwon (KR); Jae Ho Kim, Suwon (KR); Ho Jin Jung, Suwon (KR)

(73) Assignees: Hyundai Motor Company, Seoul (KR); Kia Corporation, Seoul (KR); DAS CO., LTD, Gyeongsangbuk-do (KR)

( * ) Notice: Subject to any disclaimer, the term of this patent is extended or adjusted under 35 U.S.C. 154(b) by 351 days.

(21) Appl. No.: 18/234,730

(22) Filed: Aug. 16, 2023

(65) Prior Publication Data

US 2024/0308396 A1      Sep. 19, 2024

(30) Foreign Application Priority Data

Mar. 17, 2023      (KR) ........................ 10-2023-0035279

(51) Int. Cl.
   B60N 2/14      (2006.01)
   B60N 2/02      (2006.01)
   B60N 2/08      (2006.01)

(52) U.S. Cl.
   CPC ........... B60N 2/14 (2013.01); B60N 2/02253 (2023.08); B60N 2/0875 (2013.01); B60N 2002/022 (2013.01)

(58) Field of Classification Search
   CPC .... B60N 2/14; B60N 2/02253; B60N 2/0875; B60N 2002/022; B60N 2/165; B60N 2/1635; A47C 3/18
   See application file for complete search history.

(56) References Cited

U.S. PATENT DOCUMENTS 7,108,325 B2      9/2006  Williamson et al.
7,364,234 B2      4/2008  Begin et al.
(Continued)

FOREIGN PATENT DOCUMENTS

DE      102019126654 A1 *  4/2021   ............. B60N 2/163
DE      102022211660 A1 *  6/2023   ............. B60N 2/164
(Continued)

*Primary Examiner* — David R Dunn
*Assistant Examiner* — Jessica Kathryn Thompson
(74) *Attorney, Agent, or Firm* — Fox Rothschild LLP

(57)      ABSTRACT

A device for height adjustment and swivel of a seat for a vehicle has a structure in which a first motor for height adjustment of the seat, a first reduction gear device for increasing output torque of the first motor, and a lifting device configured to lift or lower the seat by being connected to the first reduction gear device are stacked in a vertical direction, and a second motor for driving of seat swivel, a second reduction gear device for increasing output torque of the second motor, a brake device configured to stop the seat are vertically stacked between a bottom of the seat and the first motor, in order to adjust the height of the seat, enable accurate swiveling, and carry out a monopost function of the seat.

20 Claims, 13 Drawing Sheets

(56)       References Cited

U.S. PATENT DOCUMENTS

| | | | |
|---|---|---|---|
| 7,735,917 | B2 | 6/2010 | Jones et al. |
| 9,242,581 | B2 | 1/2016 | Farooq et al. |
| 10,336,215 | B2 | 7/2019 | Sowinski et al. |
| 10,829,009 | B2 * | 11/2020 | Antoniuk ................ B60N 2/165 |
| 11,208,012 | B2 * | 12/2021 | Hong ...................... B60N 2/146 |
| 12,558,999 | B2 * | 2/2026 | Kim ......................... B60N 2/14 |
| 12,559,000 | B2 * | 2/2026 | Lee .......................... B60N 2/14 |
| 2008/0048472 | A1 * | 2/2008 | Kuenzel ............. B60N 2/02246 |
| | | | 108/20 |
| 2020/0223379 | A1 | 7/2020 | Kikkawa |
| 2021/0170921 | A1 | 6/2021 | Seibold et al. |
| 2022/0161694 | A1 | 5/2022 | Numajiri et al. |
| 2024/0343169 | A1 * | 10/2024 | Lee ...................... B60N 2/1615 |

FOREIGN PATENT DOCUMENTS

| | | | |
|---|---|---|---|
| KR | 10-2148820 | B1 | 8/2020 |
| KR | 10-2475848 | B1 | 12/2022 |
| KR | 10-2530200 | B1 | 5/2023 |
| WO | 2012/134448 | A1 | 10/2012 |
| WO | 2020/109626 | A1 | 6/2020 |

* cited by examiner

DEVICE FOR HEIGHT ADJUSTMENT AND SWIVEL OF VEHICLE SEAT

CROSS-REFERENCE TO RELATED APPLICATION

This application claims under 35 U.S.C. § 119(a) the benefit of Korean Patent Application No. 10-2023-0035279, filed on Mar. 17, 2023, the entire contents of which are incorporated herein by reference.

BACKGROUND

(a) Technical Field

The present disclosure relates to a device for height adjustment and swivel of a seat for a vehicle, more particularly, to the device for height adjustment and swivel of the seat configured to function as a monopost of the seat and perform height adjustment and swivel of the seat.

(b) Description of the Related Art

In conjunction with autonomous or semi-autonomous vehicles, a seat is being developed with various mechanisms to enable conversation and meeting between passengers, relaxation and sleeping, assistance in boarding and alighting, etc.

For example, a swivel seat may allow rotation of the seat in a desired direction for multi-party meetings and conversations, external view viewing, relaxation, assistance in boarding and alighting, etc., and a height adjusting device may be provided for adjusting the height of the seat.

Generally, a swivel seat is a seat in which a swivel device having a predetermined mechanism is installed at a bottom of the seat.

However, a conventional swivel device has a disadvantage in that a volume and packaging area thereof may increase excessively because a swivel structure and a driving portion are installed separately from each other at the bottom of the seat so as to easily distribute passenger load.

Moreover, when the height adjusting device is installed at the bottom of the seat in addition to the conventional swivel device, the volume and packaging area thereof may excessively increased, and thus a usable area on the floor panel in the interior of the vehicle corresponding to the bottom of the seat may further be reduced, thereby limiting the space and hindering easy installation of convenience devices with various functions, such as a movable console, on the floor panel.

Meanwhile, in an electric vehicle, because a battery module is installed at the bottom of a floor panel, the height of the floor panel is increased by the height of the battery module, and accordingly, a method in which a seat is supported by a monopost is applied to solve the limitations in space and height of the floor panel for installing the seat.

The monopost is interconnected between the bottom of a slim seat and a floor panel so as to support the seat load and passenger load, and provides advantages such as flattening the floor panel and increasing the usable area of the floor panel.

However, because a conventional monopost interconnected between the bottom of the seat and the floor panel is too small in volume and cross-sectional area, there is a problem in that separate additional devices such as a seat swivel device and a seat height adjusting device cannot be installed in the conventional monopost.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a device for height adjustment and swivel of a seat of a vehicle having a structure in which a first motor for height adjustment of the seat, a first reduction gear device configured to increase output torque of the first motor, and a lifting device configured to lift or lower the seat by being connected to the first reduction gear device are stacked in a vertical direction, and a second motor for driving of seat swivel, a second reduction gear device configured to increase output torque of the second motor, a brake device configured to stop the seat such that the seat is stopped without swaying or causing noise during swiveling of the seat are vertically stacked between the bottom of the seat and the first motor, thereby accurately adjusting the height of the seat, enabling swiveling to be performed accurately, and performing the monopost function of the seat.

In one aspect, the present disclosure provides a device for height adjustment and/or swivel of a seat of a vehicle, the device including a first motor provided with a first eccentric shaft, a first reduction gear device connected to the first eccentric shaft of the first motor, a swivel device mounted between the first motor and the bottom of the seat and configured to swivel the seat, and a lifting device connected to the first reduction gear device and configured to lift or lower the first motor, the first reduction gear device, the swivel device, and the seat by eccentric rotational force of the first reduction gear device generated upon operation of the first motor.

In another aspect, a vehicle incorporates the device for height adjustment and/or swivel of the seat.

In a preferred embodiment, the lifting device is configured to simultaneously raise or lower the first motor, the first reduction gear device, the swivel device, and the seat.

In a preferred embodiment, the lifting device, the first reduction gear device, the first motor, and the swivel device may be sequentially stacked and assembled from bottom to top so as to constitute a monopost of the seat.

In another preferred embodiment, the first motor may include a first motor body, a first stator mounted on the inner circumferential portion of the first motor body, and a first rotor mounted on the outer circumferential surface of the first eccentric shaft and spaced apart from the first stator by a predetermined distance. Here, the first eccentric shaft may have an upper portion, which is a circular portion inserted into the first rotor, and may have a lower portion, which is an eccentric portion configured to transmit eccentric rotational force to the first reduction gear device.

In still another preferred embodiment, the first motor body may have an upper portion and a lower portion each having mounted on the first motor body an upper motor cover or a lower motor cover configured to cover the first stator, the first rotor, and the first eccentric shaft.

In yet another preferred embodiment, the first reduction gear device may include a first middle gear, which is an external gear eccentrically rotatably inserted into the first eccentric shaft, an upper body having four corners each having formed therein a first mounting hole, and having an inner circumferential portion provided thereon with a first upper gear partially engaged with the first middle gear, and a first lower gear having an inner circumferential portion provided thereon with an inner gear partially engaged with the first middle gear, and having an outer circumferential portion provided thereon with an outer gear configured to transmit rotational force to the lifting device. Here, the first middle gear may rotate eccentrically while being partially engaged with the first upper gear by the eccentric rotation of the first eccentric shaft, and at the same time, may transmit rotational force acting in a direction opposite the eccentric rotation to the first lower gear.

In still yet another preferred embodiment, the number of teeth on the inner gear of the first lower gear and the number of teeth on the first upper gear may have a difference of at least one, and the number of teeth on the first middle gear may be smaller than the larger number of teeth between the number of teeth on the inner gear of the first lower gear and the number of teeth on the first upper gear by at least two.

In a further preferred embodiment, when the first eccentric shaft makes one revolution, the first lower gear may receive rotational force from the first middle gear and rotate as much as the number of teeth on the inner gear of the first lower gear.

In another further preferred embodiment, the lifting device may include a base frame, lead screws each mounted on a corresponding position at four corners of the base frame, a lower body having four corners each having formed therein a second mounting hole, and having a central portion provided with a cylindrical portion inserted into an inner circumferential portion of the first eccentric shaft, lead nuts each rotatably mounted inside the first mounting hole in the upper body and inside the second mounting hole in the lower body, and into which a corresponding one of the lead screws is inserted, and nut gears each provided on the outer circumferential portion of a corresponding one of the lead nuts and engaged with the outer gear of the first lower gear.

In still another further preferred embodiment, the first mounting hole in the upper body may have an inner circumferential portion and the second mounting hole in the lower body may have an inner circumferential portion, and the inner circumferential portions may have mounted therein a first bearing configured to guide rotation of the lead nut.

In yet another further preferred embodiment, the outer circumferential portion of the cylindrical portion of the lower body and the inner circumferential portion of the first eccentric shaft may have mounted therebetween a second bearing configured to guide rotation of the first eccentric shaft.

In still yet another further preferred embodiment, the base frame may be fastened to a seat rail so as to be movable forwards and rearwards.

In a still further preferred embodiment, the swivel device may include a second motor having a second eccentric shaft mounted to a bottom of the seat, a second reduction gear device connected to the second eccentric shaft of the second motor, a brake device configured to release braking by eccentric rotational force of the second reduction gear device when the second motor operates and configured to exert braking force to stop the seat when the second motor stops, and a swivel plate interconnected between the brake device and the seat cushion frame of the seat and configured to transmit rotational force for swiveling to the seat.

In still another further preferred embodiment, the second motor may include a second motor body, a second stator mounted on an inner circumferential portion of the second motor body, a second rotor mounted on an outer circumferential surface of the second eccentric shaft and spaced apart from the second stator by a predetermined distance, a motor cover mounted on a lower portion of the second motor body so as to cover the second stator, the second rotor, and the second eccentric shaft, and a third bearing mounted between a lower inner circumferential surface of the second eccentric shaft and an upper outer circumferential surface of the motor cover so as to guide rotation of the second eccentric shaft. Here, the second eccentric shaft may have a lower portion, which is a circular portion into which the second rotor is mounted, and have an upper portion, which is an eccentric portion configured to transmit eccentric rotational force to the second reduction gear device.

In a yet still further preferred embodiment, the second reduction gear device may include a main body having an inner circumferential portion provided thereon with a second lower gear and being stacked and assembled on the second motor body, a clutch plate having a lower portion provided thereon with a second upper gear in a form of an inner gear and having an upper portion provided thereon with a plurality of push blocks for releasing braking of the brake device, and being rotatably inserted into the main body, and a second middle gear eccentrically rotatably inserted into the second eccentric shaft and partially engaged with both the second lower gear and the second upper gear. Here, the second middle gear may rotate eccentrically while being partially engaged with the second lower gear by the eccentric rotation of the second eccentric shaft, and at the same time, may transmit rotational force acting in a direction opposite the eccentric rotation to the second upper gear of the clutch plate.

In yet another still further preferred embodiment, the number of teeth on the second lower gear and the number of teeth on the second lower gear may have a difference of at least one, and the number of teeth on the second middle gear may be smaller than the larger number of teeth between the number of teeth on the second lower gear and the number of teeth on the second upper gear by at least two.

In yet another still further preferred embodiment, when the second eccentric shaft makes one revolution, the clutch plate may receive rotational force from the second middle gear and rotate as much as the number of teeth on the second upper gear.

In yet another still further preferred embodiment, the brake device may include a braking plate having an outer circumferential portion having formed thereon a plurality of convex wedge surfaces at equal intervals in a circumferential direction thereof, being rotatably stacked on the clutch plate, and configured to transmit rotational force for swiveling to the swivel plate, support blocks each protruding in a radial direction from a position between wedge surfaces of the brake plate, disposed between push blocks of the clutch plate, and having opposite surfaces each having formed therein a support groove, brake rollers each disposed between the push block and the support block, elastic members each connected to the brake roller and supported compressively by the support block, and a fourth bearing configured to guide rotation of the swivel plate between an inner surface of an outer circumferential end of the swivel plate and an upper outer circumferential surface of the main body.

In yet another still further preferred embodiment, the elastic member may be made of rubber or elastomer having elasticity, and may have a cylindrical shape.

In yet another still further preferred embodiment, when the clutch plate stops, the brake roller may be pushed by the elastic restoring force of the elastic member and then be sandwiched between the wedge surface and the main body so as to engage braking on the braking plate.

In yet another still further preferred embodiment, when the clutch plate rotates, the brake roller may be pushed by the brake roller and be moved away from the wedge surface and at the same time compress the elastic member, thereby releasing the brake and allowing rotation on the braking plate.

In a further aspect, the present disclosure provides a device for height adjustment and swivel of a seat of a vehicle, the device including a first motor provided with a first eccentric shaft, a first reduction gear device connected to the first eccentric shaft of the first motor, and a lifting device connected to the first reduction gear device and configured to lift or lower the first motor, the first reduction gear device, and the seat by eccentric rotational force of the first reduction gear device generated upon operation of the first motor. Here, for swiveling of the seat, the device may further include a swivel device mounted between the first motor and a bottom of the seat.

In additional aspects, vehicles are provided that comprise a seat and seat assembly as disclosed herein.

In further aspects, vehicles are provided that comprise a vehicle seat that includes a power swivel apparatus as disclosed herein.

In further aspects, vehicles are provided that comprise a power swivel apparatus as disclosed herein.

In certain aspects, a present vehicle may be an autonomous vehicle.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

As referred to herein, a monopost seat assembly or monopost seat or other similar term refers to a captain's-type vehicle seat rather than a bench-type vehicle seat or seat assembly. In certain aspects, a monopost vehicle seat may not have a seat-collapsing hinge as provided with a bench-type vehicle seat.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 6 is an exploded perspective view illustrating a first reduction gear device and a lifting device in a device for height adjustment and swivel of a vehicle seat according to the present disclosure;

FIGS. 10 and 11 are exploded perspective views illustrating a second reduction gear device in a device for height adjustment and swivel of a vehicle seat according to the present disclosure;

Figure 15:
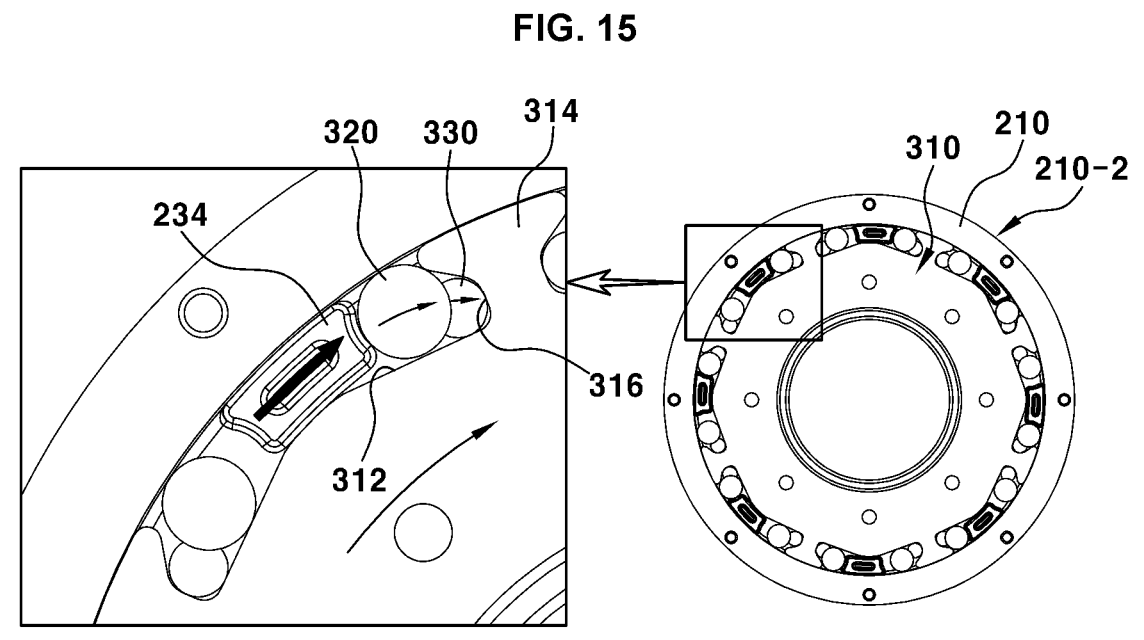

FIG. 15 is a plan view illustrating a state in which braking is released in a brake device of a power swivel device for a vehicle seat according to the present disclosure.

Figure 1:
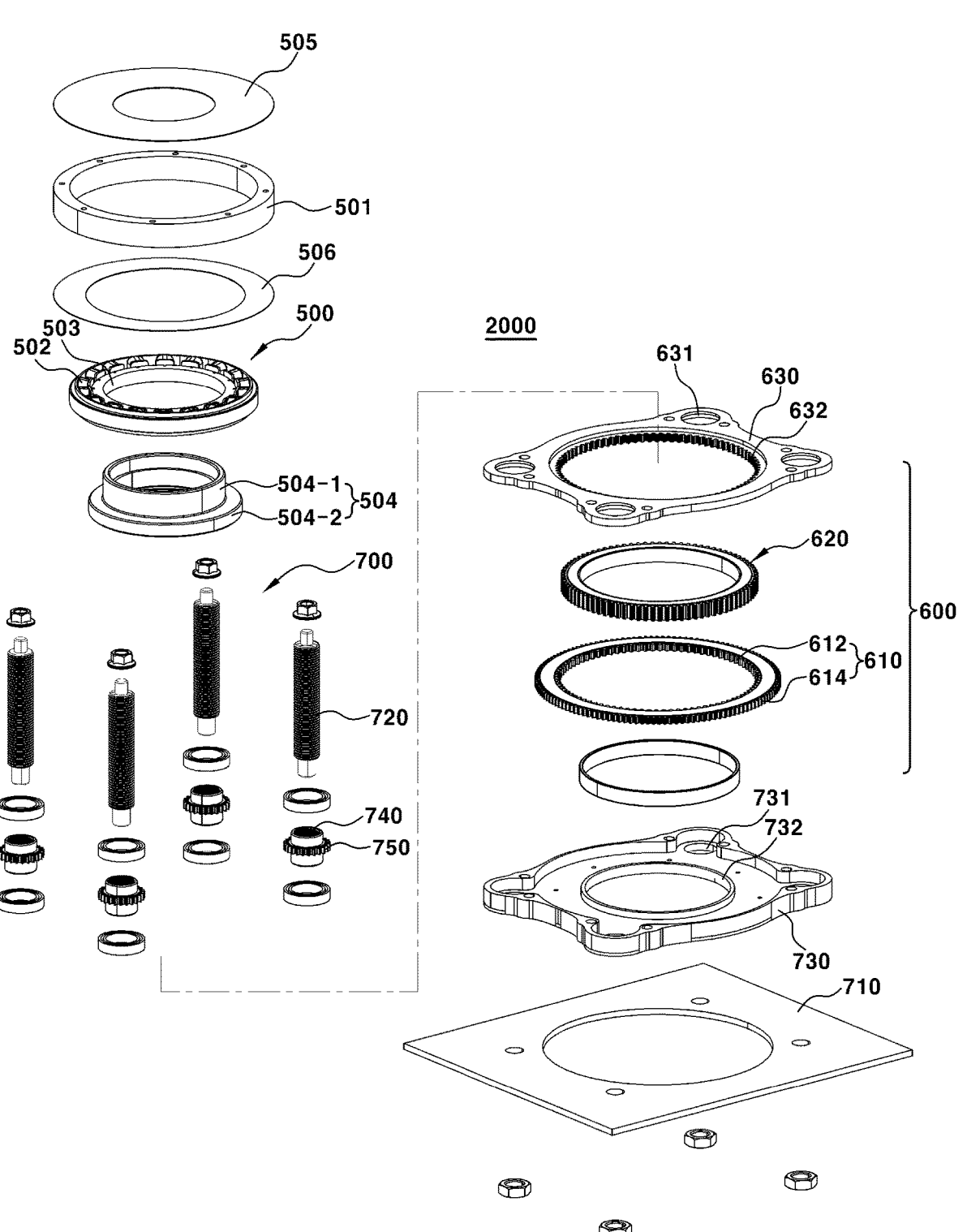
FIG. 1 is an exploded perspective view illustrating a structure for seat height adjustment in a device for height adjustment and swivel of a vehicle seat according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN). Hereinafter, preferred embodiments of the present disclosure will be described with reference to the accompanying drawings.

According to the present disclosure, there is provided a device for height adjustment and/or swivel of a set of a vehicle having a structure in which only a height adjusting device that functions as a monopost is mounted at a bottom of the seat, or a height adjusting device and a swivel device that function as a monopost are stacked on the bottom of the seat.

Figure 2:
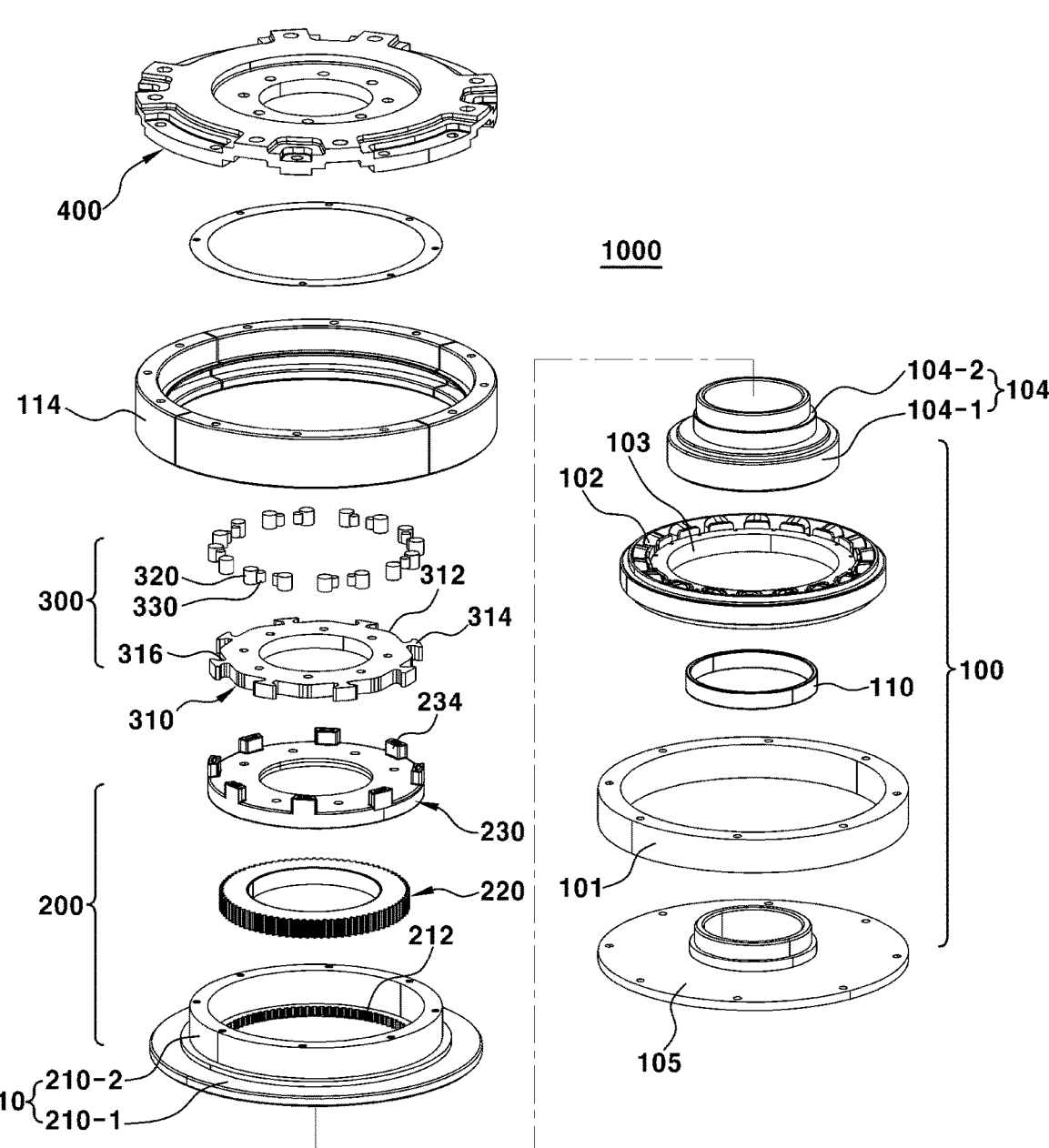
FIG. 2 is an exploded perspective view illustrating a structure for seat swivel in a device for height adjustment and swivel of a vehicle seat according to the present disclosure.
Figure 3:
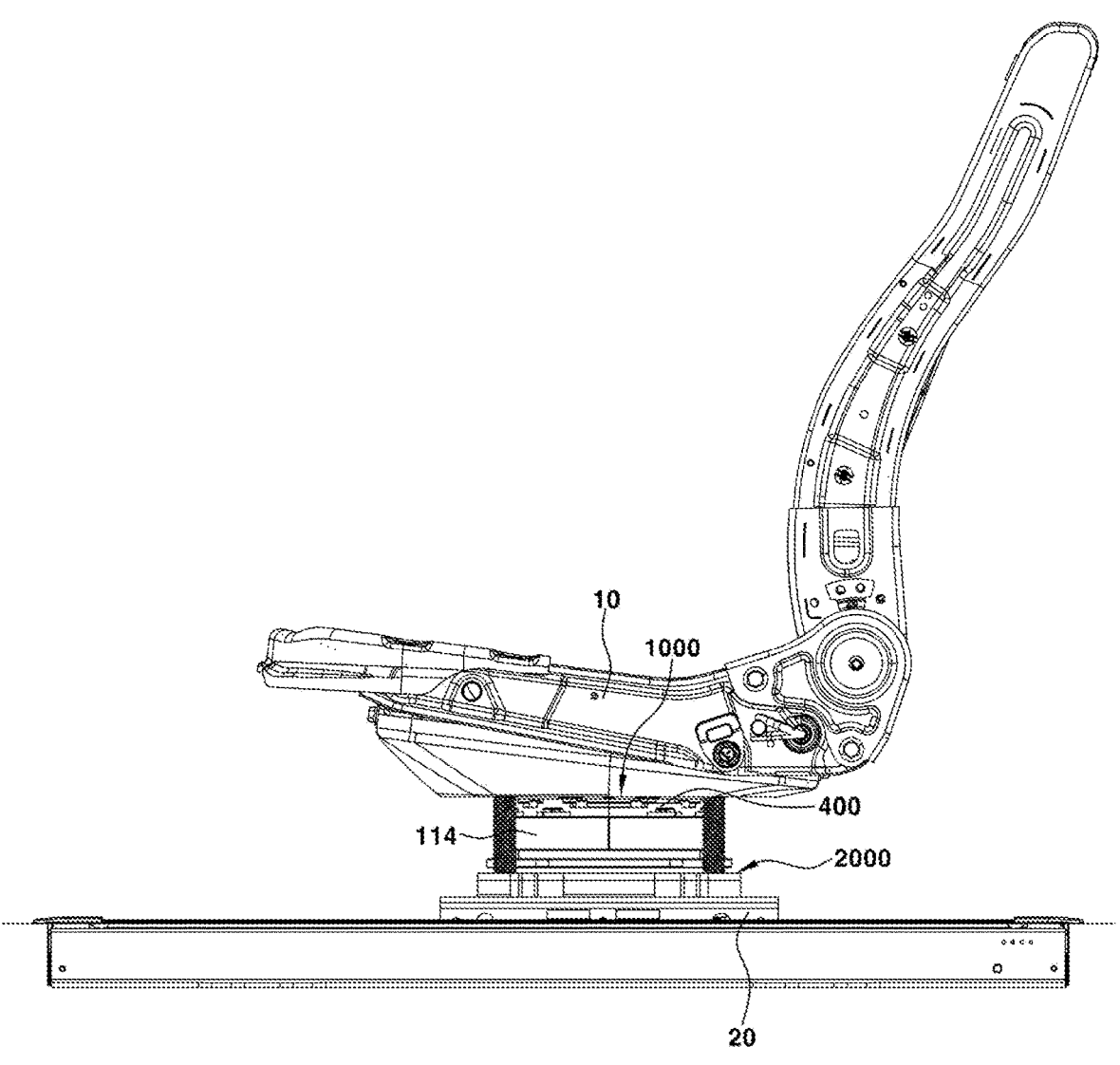
FIG. 3 is a side view illustrating a state in which a device for height adjustment and swivel of a vehicle seat according to the present disclosure is mounted to the bottom of the seat.
Figure 4:
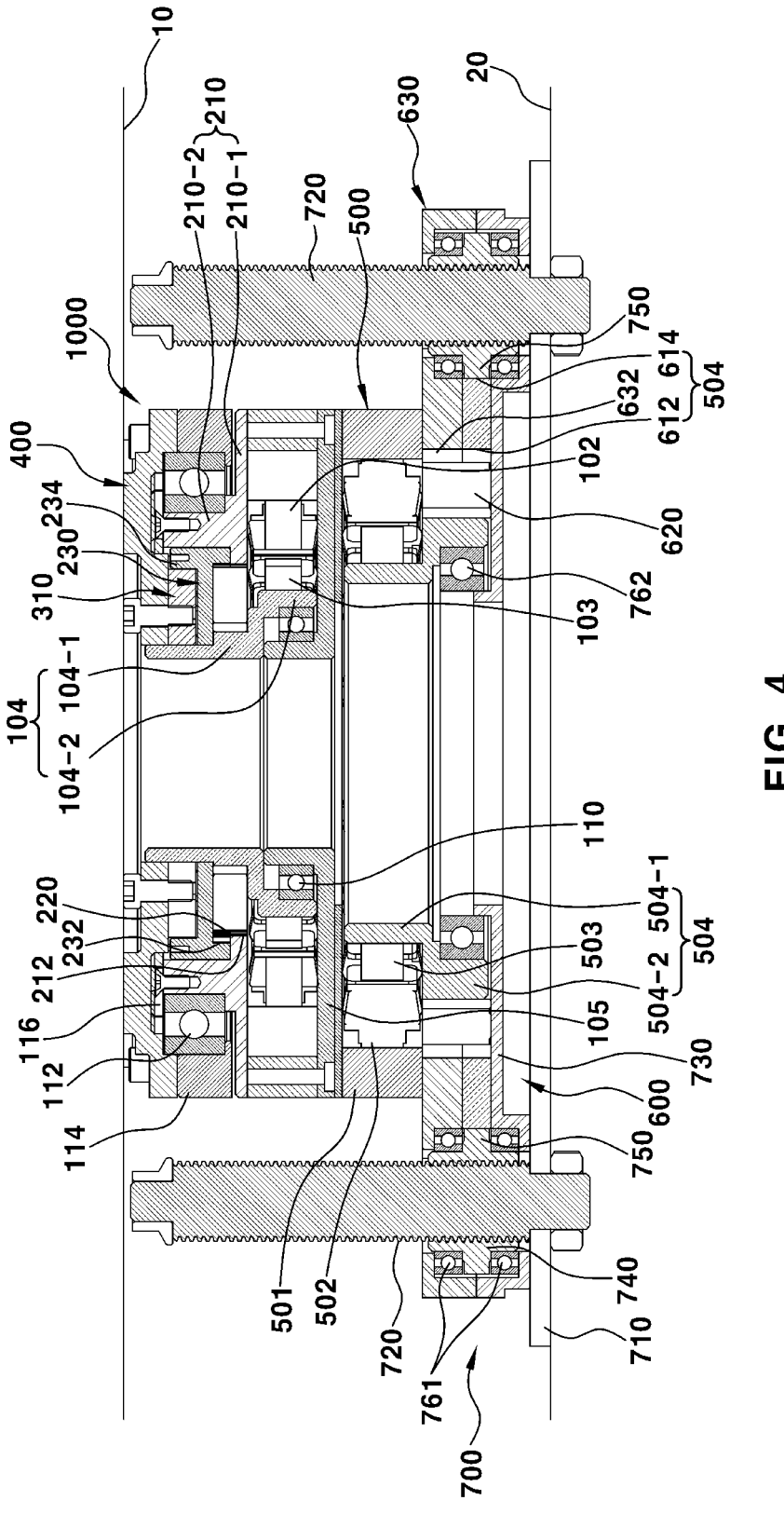
FIG. 4 is a cross-sectional view illustrating a device for height adjustment and swivel of a vehicle seat according to the present disclosure.

FIGS. 1 and 2 are exploded perspective views illustrating a device for height adjustment and swivel of a vehicle seat according to the present disclosure, FIG. 3 is a side view illustrating a state in which a device for height adjustment and swivel of a vehicle seat according to the present disclosure is mounted to the bottom of the seat, and FIG. 4 is a cross-sectional view illustrating a device for height adjustment and swivel of a vehicle seat according to the present disclosure.

As illustrated in FIGS. 1 to 4, a device for height adjustment and swivel of a seat of a vehicle according to the present disclosure includes a lifting device 700, a first reduction gear device 600, a first motor 500, and a swivel device 1000, sequentially stacked and assembled from bottom to top.

In other words, a seat height adjusting device 2000 including the lifting device 700, the first reduction gear device 600, and the first motor 500 sequentially stacked and assembled from bottom to top, and the seat swivel device 1000 stacked between the first motor 500 and a seat cushion frame 10 may constitute a monopost of the seat.

Accordingly, the lifting device 700, the first reduction gear device 600, the first motor 500, and the swivel device 1000 are sequentially stacked to function as the monopost of the seat, and as such, a wide flattened space may be secured on the floor panel, thereby improving convenience for vehicle passengers.

The first motor 500 may rotate a first eccentric shaft 504 disposed at the central portion thereof.

Figure 5:
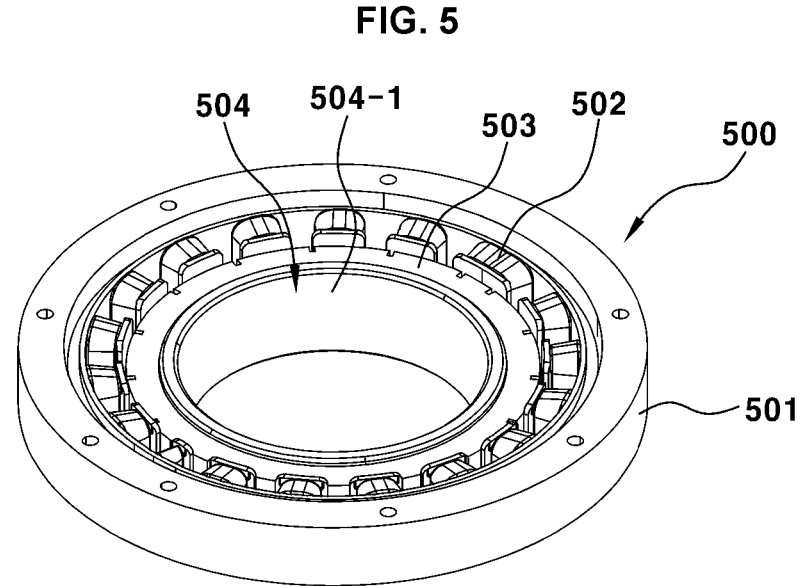
FIG. 5 is a perspective view illustrating a first motor in a device for height adjustment and swivel of a vehicle seat according to the present disclosure.

To this end, the first motor 500 may include, as illustrated in FIG. 5, a first motor body 501 having a cylindrical shape having open upper and lower portions, a first stator 502 mounted on the inner circumferential portion of the first motor body 501, a first rotor 503 spaced apart from the inner circumferential surface of the first stator 502 by a predetermined distance, a first eccentric shaft 504 mounted on the inner circumferential portion of the first rotor 503, and an upper motor cover 505 and a lower motor cover 506 each mounted at the upper and lower portions of the first motor body 501 so as to cover the first stator 502, the first rotor 503, and the first eccentric shaft 504.

Here, the first eccentric shaft 504 is a hollow structure including a circular portion 504-1 at the upper portion thereof and an eccentric portion 504-2 at the lower portion thereof integrated with the circular portion 504-1.

In other words, the first eccentric shaft 504 has an upper portion, which is the circular portion 504-1 inserted into the inner circumferential portion of the first rotor 503, and has a lower portion, which is the eccentric portion 504-2 configured to transmit eccentric rotational force to the first reduction gear device 600.

Accordingly, the first rotor 503 is mounted to the outer circumferential surface of the circular portion 504-1 of the first eccentric shaft 504, and then the first rotor 503 and the first eccentric shaft 504 are rotatably inserted into the inner circumferential portion of the first stator 502 to thereby dispose the first rotor 503 to be spaced apart from the inner circumferential surface of the first stator 502 by a predetermined distance.

In particular, the first stator 502 may have a structure in which a plurality of electromagnets with coils wound thereon is attached along the inner surface of the cylindrical body at equal intervals, and the first rotor 503 may have a structure in which permanent magnets each divided into an N pole and an S pole are attached along the outer circumferential surface of the first eccentric shaft 504.

With this configuration, when the first rotor 503 is rotated by three-phase current supplied to the first stator 502, the first eccentric shaft 504 may rotate together with the first rotor 503, and at the same time, the eccentric portion 504-2 of the first eccentric shaft 504 may rotate eccentrically.

The first reduction gear device 600 is stacked and assembled on the bottom of the first motor 500 while being connected to the first eccentric shaft 504, and is configured to increase the output torque of the first motor 500 for adjusting the height of the seat.

Figure 6:
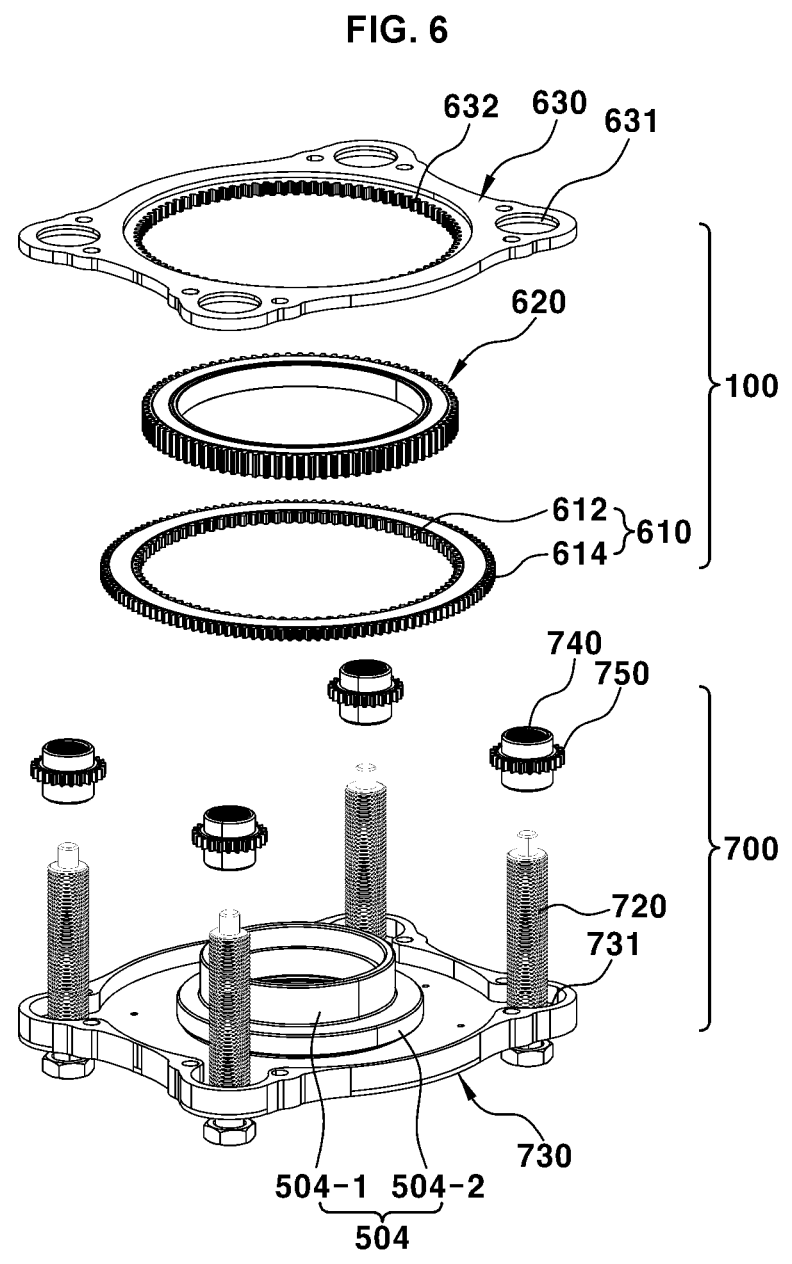
Figure 7:
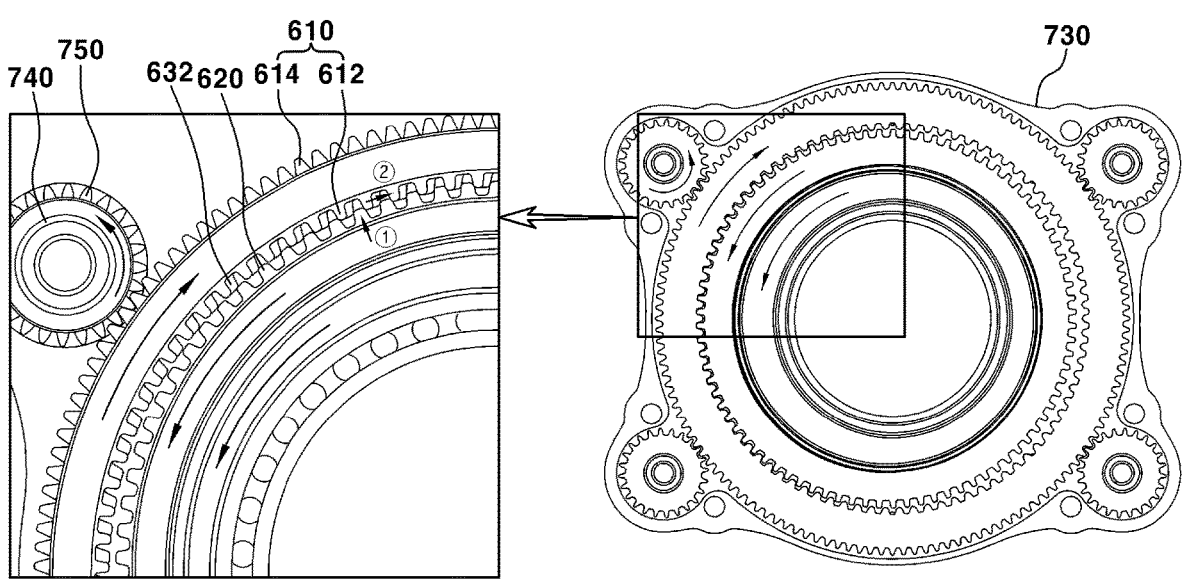
FIG. 7 is a cross-sectional view illustrating a first reduction gear device and a lifting device in a device for height adjustment and swivel of a vehicle seat according to the present disclosure.

To this end, the first reduction gear device 600 may include, as illustrated in FIGS. 6 and 7, a first middle gear 620 eccentrically rotatably inserted into the first eccentric shaft 504, an upper body 630 provided thereon with a first upper gear 632 partially engaged with the first middle gear 620, and a first lower gear 610 provided thereon with an inner gear 612 engaged with the first middle gear 620 and provided thereon with an outer gear 614 configured to transmit rotational force to the lifting device 700.

The first middle gear 620 is an external gear eccentrically rotatably inserted into the outer circumferential portion of the eccentric portion 504-2 of the first eccentric shaft 504.

The upper body 630 has four corners each having formed therein a first mounting hole 631, and has an inner circumferential portion provided thereon with the first upper gear 632 partially engaged with the first middle gear 620.

The first lower gear 610 has an inner circumferential portion provided thereon with the inner gear 612 partially engaged with the first middle gear 620, and has an outer circumferential portion provided thereon with the outer gear 614 configured to transmit rotational force to the lifting device 700.

Accordingly, the first middle gear 620 rotates eccentrically while being partially engaged with the first upper gear 632 by the eccentric rotation of the first eccentric shaft 504, and at the same time, transmits rotational force acting in a direction opposite the eccentric rotation to the first lower gear 610.

To this end, the number of teeth on the inner gear 612 of the first lower gear 610 and the number of teeth on the first upper gear 632 may have a difference of at least one, and the number of teeth on the first middle gear 620 may be smaller than the larger number of teeth between the number of teeth on the inner gear 612 of the first lower gear 610 and the number of teeth on the first upper gear 632 by at least two.

For example, the first upper gear 632 may have eighty teeth, the inner gear 612 of the first lower gear 610 may have seventy nine teeth, and the first middle gear 620 may have seventy eight teeth.

Accordingly, when the first eccentric shaft 504 makes one revolution by the operation of the first motor 500, the first lower gear 610 may receive rotational force from the first middle gear 620 and rotate as much as the number of teeth on the inner gear 612 of the first lower gear 610.

In particular, as illustrated in FIG. 7, when the eccentric portion 504-2 of the first eccentric shaft 504 rotates eccentrically in one direction and the first middle gear 620 inserted into the eccentric portion 504-2 also rotates eccentrically in the one direction by the operation of the first motor 500, the teeth on the first middle gear 620 are inserted between the teeth on the first upper gear 632 in the direction of the arrow indicated by ① in FIG. 7, and at the same time, push the teeth on the inner gear 612 of the first lower gear 610 in another direction, that is, the direction of the arrow indicated by ② in FIG. 7, thereby allowing the first lower gear 610 to rotate in the other direction as much as the number of teeth on the inner gear of the first lower gear.

Here, when the first lower gear 610 rotates in the other direction, the outer gear 614 of the first lower gear 610 may transmit rotational force to the lifting device 700.

Accordingly, when the first eccentric shaft 504 and the first middle gear 620 continue to rotate in one direction by the operation of the first motor 500, the first lower gear 610 may be easily rotated in the other direction, allowing the rotational force to be transmitted to the lifting device 700 via the outer gear 614 of the first lower gear 610, thereby increasing the output torque of the first motor 500 for adjusting the height of the seat.

The lifting device 700 may lift or lower the first motor 500, the first reduction gear device 600, the swivel device 1000, and the seat, preferably at the same time, by receiving rotational force from the outer gear 614 of the first lower gear 610 constituting the first reduction gear device 600. In other words, the lifting device 700 may simultaneously raise or lower the first motor 500, the first reduction gear 600, the swivel device 1000, and the seat.

To this end, the lifting device 700 may include, as illustrated in FIGS. 4, 6, and 7, a base frame 710, lead screws 720 each mounted on a corresponding position at four corners of the base frame 710, a lower body 730 stacked on the base frame 710, lead nuts 740 each rotatably mounted in the upper body and in the lower body and into which the lead screw 720 is inserted, and nut gears 750 each provided on the outer circumferential portion of the lead nut 740.

The base frame 710 may be fastened to a seat rail 20 so as to be movable forwards and rearwards.

In other words, when an indoor floor panel of the vehicle has mounted thereon the seat rail 20 configured to adjust the front and rear position of the seat, the base frame 710 may be fastened to the seat rail 20 so as to be movable forwards and rearwards, so that the front and rear position of the seat may be adjusted.

The lead screws 720 each have a lower end portion mounted at a corresponding one of the four corners of the base frame 710 and are arranged to stand vertically upwards.

The lower body 730 has four corners each having formed therein a second mounting hole 731 vertically coinciding with the first mounting hole 631 in the upper body 630 and has a central portion provided with a cylindrical portion 732 inserted into the inner circumferential portion of the first eccentric shaft 504, and is stacked on the base frame 710 by being movable up and down.

The lead nut 740 is rotatably inserted into the first mounting hole 631 in the upper body 630 and the second mounting hole 731 in the lower body 730.

Here, because the lead screw 720 is inserted into the lead nut 740, the lead nut 740 may move up or down along the lead screw 720 when the lead nut 740 rotates.

The nut gear 750 is provided on the outer circumferential portion of the lead nut 740 and is engaged with the outer gear 614 of the first lower gear 610.

Accordingly, when the first lower gear 610 rotates, rotational force is transmitted from the outer gear 614 to the nut gear 750, so that the lead nut 740 may be rotated.

Meanwhile, the inner circumferential portion of the first mounting hole 631 in the upper body 630 and the inner circumferential portion of the second mounting hole 731 in the lower body 730 have mounted therein a first bearing 761 configured to guide rotation of the lead nut 740.

In addition, the outer circumferential portion of the cylindrical portion 732 of the lower body 730 and the inner circumferential portion of the eccentric portion 504-2 of the first eccentric shaft 504 have mounted therebetween a second bearing 762 configured to guide rotation of the first eccentric shaft 504.

Here, the operation flow of the seat height adjusting device 2000 according to the present disclosure is as follows.

First, when the first rotor 503 is rotated by the operation of the first motor 500, the first eccentric shaft 504 coupled to the first rotor 503 rotates, the eccentric portion 504-2 of the first eccentric shaft 504 rotates eccentrically, and the first middle gear 620 fastened to the eccentric portion 504-2 of the first eccentric shaft 504 also rotates eccentrically.

Here, the first middle gear 620 rotates eccentrically while being partially engaged with the first upper gear 632 by the eccentric rotation of the first eccentric shaft 504, and at the same time, transmits rotational force acting in a direction opposite the eccentric rotation to the first lower gear 610.

In other words, as described above, when the eccentric portion 504-2 of the first eccentric shaft 504 rotates eccentrically in one direction and the first middle gear 620 inserted into the eccentric portion 504-2 also rotates eccentrically in the one direction, the teeth on the first middle gear 620 are inserted between the teeth on the first upper gear 632 in the direction of the arrow indicated by ① in FIG. 7, and at the same time, push the teeth on the inner gear 612 of the first lower gear 610 in another direction, that is, the direction of the arrow indicated by ② in FIG. 7, thereby allowing the first lower gear 610 to rotate in the other direction as much as the number of teeth on the inner gear of the first lower gear.

Subsequently, when the first eccentric shaft 504 and the first middle gear 620 rotate in one direction, the first lower gear 610 may continuously rotate in another direction.

Here, when the first lower gear 610 rotates in the other direction, the outer gear 614 of the first lower gear 610 may transmit rotational force to the nut gear 750, which is a component of the lifting device 700.

Thereafter, the lead nut 740 is rotated by the rotational force transmitted from the outer gear 614 of the first lower gear 610 to the nut gear 750, whereby the lead nut 740 moves up or down along the lead screw 720.

Accordingly, when the lead nut 740 moves up or down along the lead screw 720, the first motor 500, the first reduction gear device 600, the swivel device 1000, and the seat cushion frame 10, as well as the upper body 630 and lower body 730 to which the lead nut 740 is mounted, may be lifted or lowered together, and accordingly, the height of the seat may be easily adjusted.

Here, the structure of the swivel device 1000 according to the present disclosure is as follows.

As illustrated in FIGS. 2 to 4, the swivel device 1000 according to the present disclosure is a component to swivel the seat, separately from the seat height adjusting device 2000, and includes the second motor 100, the second reduction gear device 200, the brake device 300, and the swivel plate 400, which are sequentially stacked and assembled from bottom to top.

The second motor 100 may rotate a second eccentric shaft 104 disposed at the central portion thereof.

Figure 9:
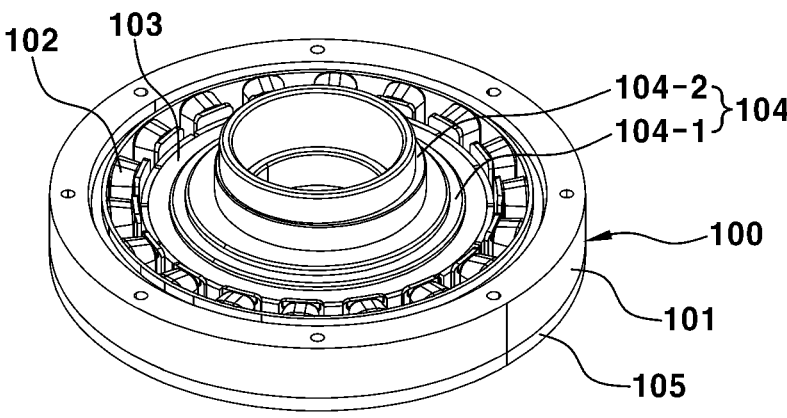
FIG. 9 is a perspective view illustrating a second motor in a device for height adjustment and swivel of a vehicle seat according to the present disclosure.

To this end, the second motor 100 may include, as illustrated in FIG. 9, a second motor body 101 having a cylindrical shape having open upper and lower portions, a second stator 102 mounted on the inner circumferential portion of the second motor body 101, a second rotor 103 spaced apart from the inner circumferential surface of the second stator 102 by a predetermined distance, a second eccentric shaft 104 mounted on the inner circumferential portion of the second rotor 103, and a motor cover 105 mounted at the lower portion of the second motor body 101 so as to cover the second stator 102, the second rotor 103, and the second eccentric shaft 104.

Here, the second eccentric shaft 104 is a hollow structure including a circular portion 104-1 at the lower portion thereof and an eccentric portion 104-2 at the upper portion thereof integrated with the circular portion 104-1.

Accordingly, the second rotor 103 is mounted to the outer circumferential surface of the circular portion 104-1 of the second eccentric shaft 104, and then the second rotor 103 and the second eccentric shaft 104 are rotatably inserted into the inner circumferential portion of the second stator 102 to thereby dispose the second rotor 103 to be spaced apart from the inner circumferential surface of the second stator 102 by a predetermined distance.

In particular, the second stator 102 may have a structure in which a plurality of electromagnets with coils wound thereon is attached along the inner surface of the cylindrical body at equal intervals, and the second rotor 103 may have a structure in which permanent magnets each divided into an N pole and an S pole are attached along the outer circumferential surface of the second eccentric shaft 104.

With this configuration, when the second rotor 103 is rotated by three-phase current supplied to the second stator 102, the second eccentric shaft 104 may rotate together with the second rotor 103, and at the same time, the eccentric portion 104-2 of the second eccentric shaft 104 may rotate eccentrically.

Here, the lower inner circumferential surface of the second eccentric shaft 104 and the upper outer circumferential surface of the motor cover 105 have mounted therebetween a third bearing 110 configured to guide rotation of the second eccentric shaft 104.

In other words, because the third bearing 110 is mounted between the inner circumferential surface of the circular portion 104-1 of the second eccentric shaft 104 and the upper outer circumferential surface of the motor cover 105, the second eccentric shaft 104 may be easily rotated together with the second rotor 103 by the rotation guidance of the third bearing 110.

The second reduction gear device 200 is stacked and assembled on the top of the second motor 100 while being connected to the second eccentric shaft 104, and is configured to increase the output torque of the second motor 100 for swiveling the seat.

Figure 10:
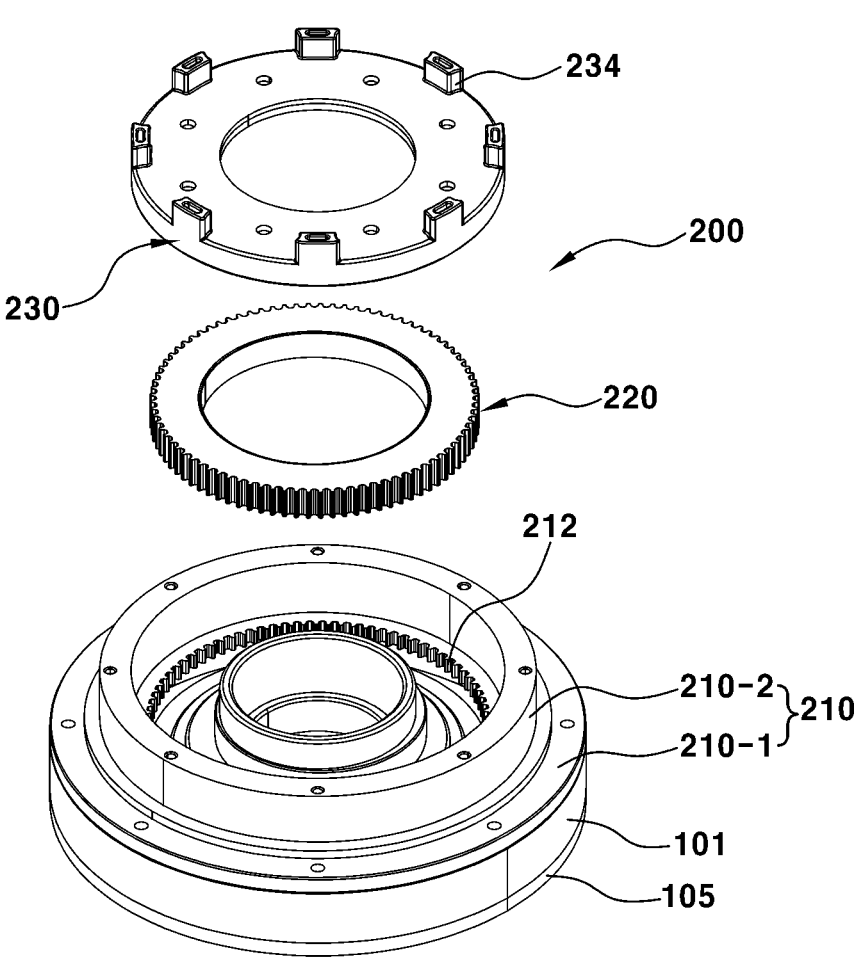
Figure 11:
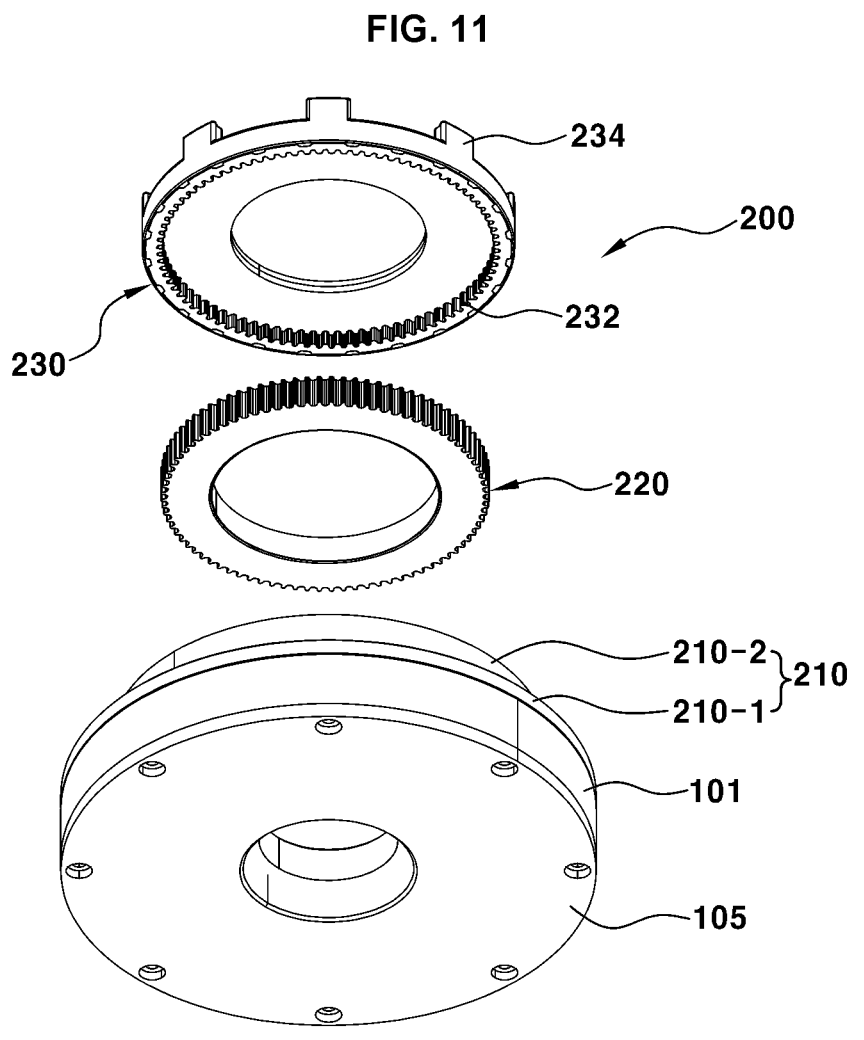

To this end, the second reduction gear device 200 may include, as illustrated in FIGS. 10 and 11, a main body 210 provided thereon with a second lower gear 212, a clutch plate 230 provided thereon with a second upper gear 232 and a plurality of push blocks 234, and a second middle gear 220 engaged with both the second lower gear 212 and the second upper gear 232.

The main body 210 includes a disk portion 210-1 stacked and assembled on the second motor body 101, and a cylindrical portion 210-2 integrated with the disk portion 210-1 and having an inner circumferential portion provided thereon with the second lower gear 212 in the form of an inner gear.

Here, when the disk portion 210-1 of the main body 210 is stacked and assembled on the motor body 101, the eccentric portion 104-2 of the second eccentric shaft 104 is placed on the central portion of the cylindrical portion 210-2 of the main body 210.

The second middle gear 220 is an external gear eccentrically rotatably inserted into the eccentric portion 104-2 of the second eccentric shaft 104 and partially engaged with the second lower gear 212.

The clutch plate 230 has a disk-shaped ring shape, which has a lower surface provided with the second upper gear 232, in the form of an internal gear, along the outer circumferential end thereof and has an upper surface portion provided with the plurality of push blocks 234 for releasing braking of the brake device 300, to be described later, along the outer circumferential end thereof at equal intervals.

Here, when the clutch plate 230 is inserted into the cylindrical portion 210-2 of the main body 210, the second upper gear 232 of the clutch plate 230 is partially engaged with the second middle gear 220.

As such, the second lower gear 212 provided on the cylindrical portion 210-2 of the main body 210 and the second upper gear 232 of the clutch plate 230 are both partially engaged with the second middle gear 220.

Accordingly, the second middle gear 220 rotates eccentrically while being partially engaged with the second lower gear 212 by the eccentric rotation of the second eccentric shaft 104, and at the same time, transmits rotational force acting in a direction opposite the eccentric rotation to the second upper gear 232.

To this end, the number of teeth on the second lower gear 212 and the number of teeth on the second upper gear 232 may have a difference of at least one, and the number of teeth on second middle gear 220 may be smaller than the larger number of teeth between the number of teeth on the second lower gear 212 and the number of teeth on second upper gear 232 by at least two.

For example, the second lower gear 212 may have eighty teeth, the second upper gear 232 may have seventy nine teeth, and the second middle gear 220 may have seventy eight teeth.

Accordingly, when the second eccentric shaft 104 makes one revolution by the operation of the second motor 100, the clutch plate 230 may receive rotational force from the second middle gear 220 and rotate as much as the number of teeth on the second upper gear 232.

Figure 12:
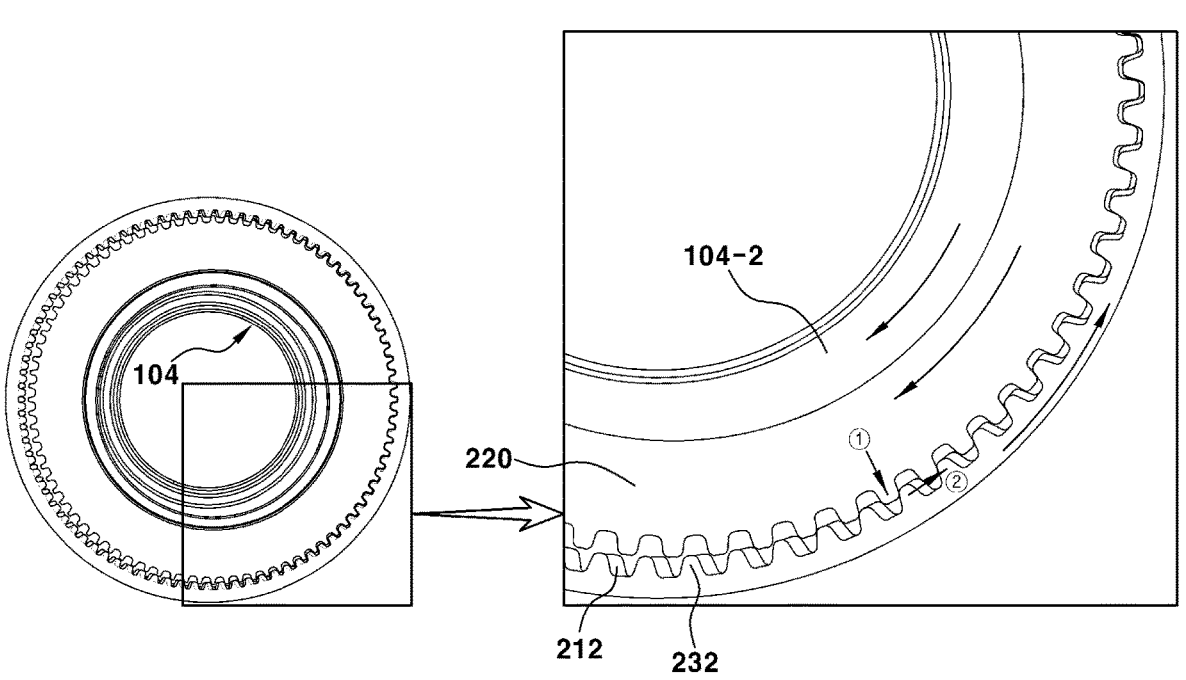
FIG. 12 is a cross-sectional view illustrating a second reduction gear device in a device for height adjustment and swivel of a vehicle seat according to the present disclosure.
Figure 13:
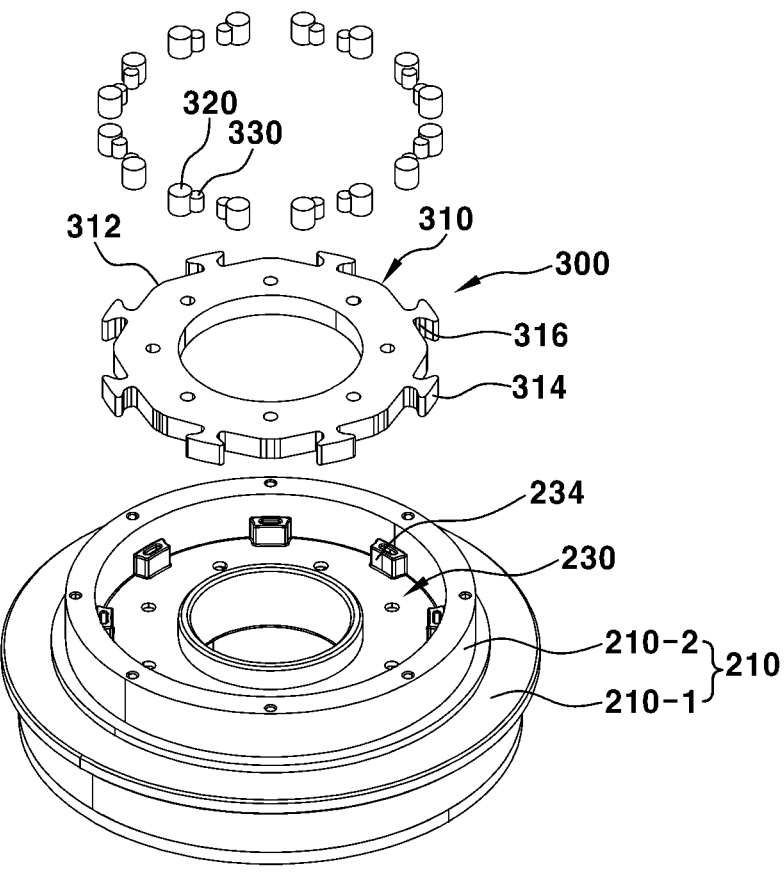
FIG. 13 is an exploded perspective view illustrating a brake device of a power swivel device for a vehicle seat according to the present disclosure.
Figure 14:
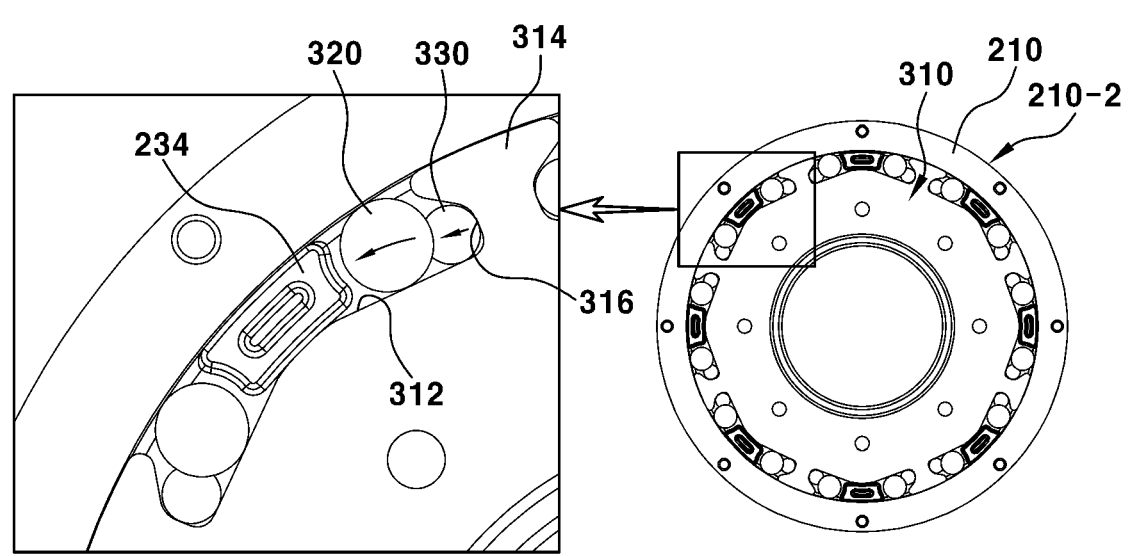
FIG. 14 is a plan view illustrating a state in which braking is engaged in a brake device of a power swivel device for a vehicle seat according to the present disclosure.

In particular, as illustrated in FIG. 12, when the eccentric portion 104-2 of the second eccentric shaft 104 rotates eccentrically in one direction and the second middle gear 220 inserted into the eccentric portion 104-2 also rotates eccentrically in the one direction by the operation of the second motor 100, the teeth on the second middle gear 220 are inserted between the teeth on the second lower gear 212 in the direction of the arrow indicated by ① in FIG. 12, and at the same time, push the teeth on the second upper gear 232 in another direction, that is, the direction of the arrow indicated by ② in FIG. 12, thereby allowing the clutch plate 230 having the second upper gear 232 to rotate in the other direction as much as the number of teeth on the second upper gear 232.

Eventually, when the second eccentric shaft 104 and the second middle gear 220 continue to rotate in one direction by the operation of the second motor 100, the clutch plate 230 having the second upper gear 232 may be easily rotated in the other direction, thereby increasing the output torque of the second motor 100 for swiveling the seat.

When the second motor 100 operates, braking on the brake device 300 may be released by the clutch plate 230 rotated by the eccentric rotational force of the reduction gear device, and the brake device 300 may exert braking force so that the seat may stop without swaying or causing noise.

Figure 8:
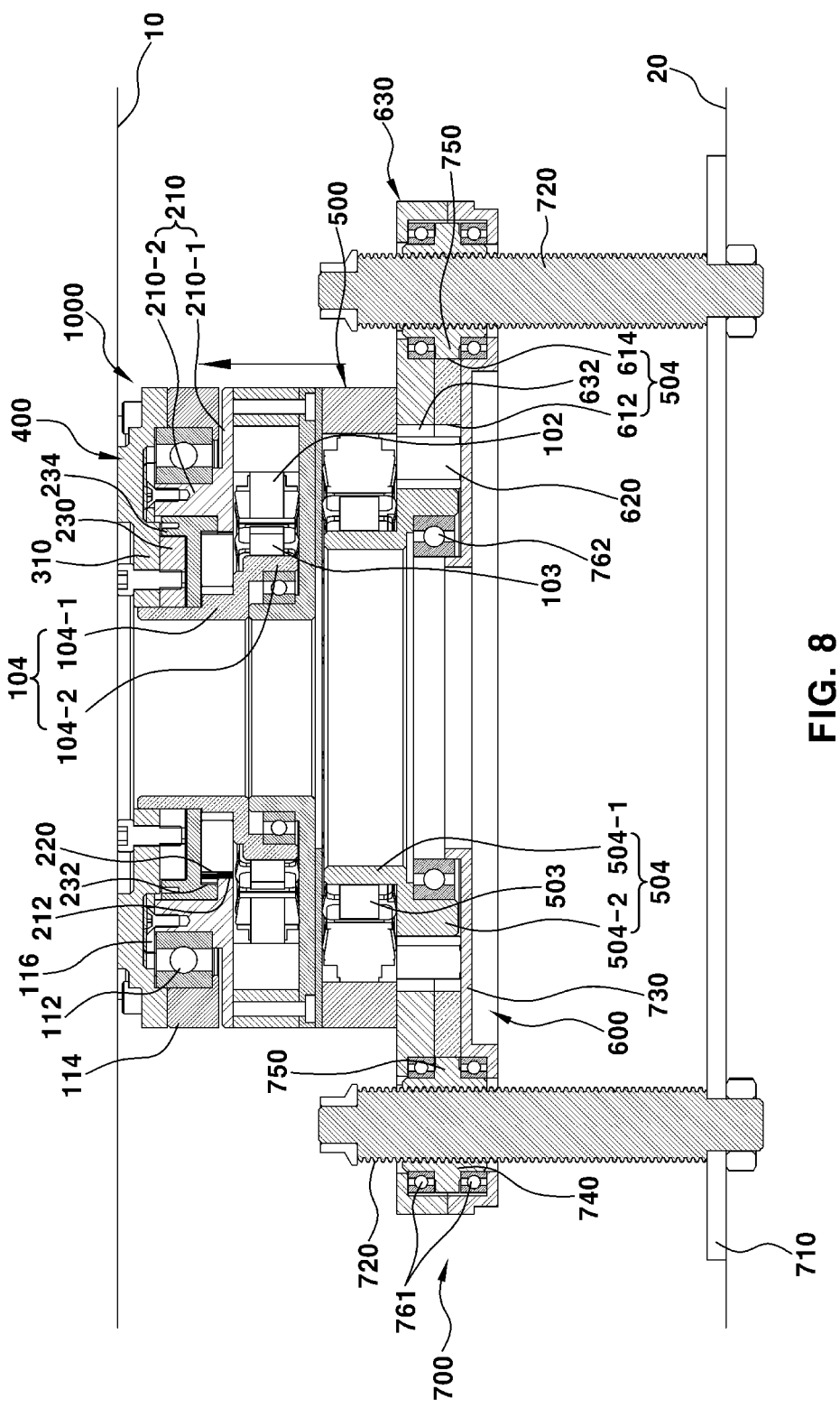
FIG. 8 is a cross-sectional view illustrating a state in which a seat is lifted by a height adjusting device of the vehicle seat according to the present disclosure.

To this end, the brake device 300 may include, as illustrated in FIGS. 8, 9, and 10, a braking plate 310 rotatably stacked on the clutch plate 230, and a plurality of brake rollers 320 and elastic members 330 configured to release braking or engage braking (stoppage) on the braking plate 310.

The braking plate 310 has an outer circumferential portion having formed thereon a plurality of convex wedge surfaces 312 at equal intervals in the circumferential direction thereof, and has support blocks 314 each protruding in a radial direction from a position between the wedge surfaces 312.

Here, when the braking plate 310 is rotatably stacked on the clutch plate 230, the support blocks 314 are each disposed between the push blocks 234 of the clutch plate 230.

The brake roller 320 has a cylindrical shape, is disposed in the circumferential direction by being placed between the push block 234 and the support block 314, and is disposed between the outer circumferential surface of the braking plate 310 and the inner circumferential surface of the cylindrical portion 210-2 of the main body 210 in the radial direction.

The elastic member 330 is supported compressively by the support block 314 by being connected to one side portion of the brake roller 320. The elastic member 330 may have a cylindrical shape and be made of rubber or elastomer having elasticity.

Here, the support block 314 may have opposite sides each having formed therein a support groove 316 into which the elastic member 330 is compressively inserted.

Accordingly, when eccentric rotational force of the second eccentric shaft 104 and the middle gear 220 generated by the operation of the second motor 100 is transmitted to the upper gear 232 to thereby rotate the clutch plate 230, the push block 234 of the clutch plate 230 pushes the brake roller 320 in the circumferential direction, and subsequently, the brake roller 320 moves away from the wedge surface 312 of the brake plate 310 and compresses the elastic member 330 supported by the support block 314, thereby releasing braking of the braking plate 310.

Here, the elastic member 330 is in a state of being compressed and inserted into the support groove 316 formed in the support block 314.

Subsequently, when the clutch plate 230 rotates, the force of the push block 234 pushing the brake roller 320 in the circumferential direction is applied to the support block 314 via the elastic member 330, thereby rotating the braking plate 310.

Conversely, when the second eccentric shaft 104, the middle gear 220, and the clutch plate 230 having the upper gear 232 are stopped when the second motor 100 stops operating, the brake roller 320 is pushed by the elastic restoring force of the elastic member 330 and then is sandwiched between the wedge surface 312 of the braking plate 310 and the inner circumferential surface of the cylindrical portion 210-2 of the main body 210 to thereby engage braking on the braking plate 310.

The swivel plate 400 is stacked on the braking plate 310 among the components of the brake device 300 and is assembled thereto using a bolt or the like in order to transmit rotational force for swiveling to the seat.

Accordingly, the swivel plate 400 may transmit rotational force for swiveling to the seat while rotating together with the rotation of the braking plate 310.

Here, for smooth rotation of the swivel plate 400, as illustrated in FIG. 4, the inner surface of the outer circumferential end of the swivel plate 400 and the outer circumferential surface of the cylindrical portion 210-2 of the main body 210 have mounted therebetween a fourth bearing 112 configured to guide rotation of the swivel plate 400.

Specifically, in order to fix the fourth bearing 112 at an accurate position for guiding the rotation of the swivel plate 400, the disk portion 210-1 of the main body 210 may have seated thereon a support ring 114 configured to support the bottom of the fourth bearing 112 and the lower outer circumferential end of the swivel plate 400.

In particular, in order to prevent the fourth bearing 112 from being lifted up or shaken when the swivel plate 400 rotates, the upper surface portion of the cylindrical portion 210-2 of the main body 210 may have further mounted thereon a bearing fixation ring 116 brought into close contact with the upper surface portion of the fourth bearing 112.

Meanwhile, the seat cushion frame 10 of the seat is mounted on the swivel plate 400 for seat swivel.

Accordingly, when the swivel plate 400 rotates together with the rotation of the braking plate 310, the seat cushion frame 10 mounted on the swivel plate 400 also rotates, so that the seat may be swiveled.

Here, the operation flow of the swivel device of the present disclosure having the above-described configuration is as follows.

First, when the second rotor 103 is rotated by the operation of the second motor 100, the second eccentric shaft 104 coupled to the second rotor 103 rotates, the eccentric portion 104-2 of the second eccentric shaft 104 rotates eccentrically, and the second middle gear 220 fastened to the eccentric portion 104-2 of the second eccentric shaft 104 also rotates eccentrically.

Here, the second middle gear 220 rotates eccentrically while being partially engaged with the second lower gear 212, and at the same time, transmits rotational force acting in a direction opposite the eccentric rotation to the second upper gear 232 of the clutch plate 230.

In other words, as described above, when the eccentric portion 104-2 of the second eccentric shaft 104 rotates eccentrically in one direction and the second middle gear 220 inserted into the eccentric portion 104-2 also rotates eccentrically in the one direction, the teeth on the second middle gear 220 are inserted between the teeth on the second lower gear 212 in the direction of the arrow indicated by ① in FIG. 12, and at the same time, push the teeth on the second upper gear 232 in another direction, that is, the direction of the arrow indicated by ② in FIG. 12, thereby allowing the clutch plate 230 having the second upper gear 232 to rotate in the other direction as much as the number of teeth on the second upper gear 232.

Subsequently, when the second eccentric shaft 104 and the second middle gear 220 rotate in one direction, the clutch plate 230 having the second upper gear 232 may continuously rotate in another direction.

Here, when the eccentric rotational force of the second middle gear 220 is transmitted to the second upper gear 232 and the clutch plate 230 rotates, the push block 234 of the clutch plate 230 pushes the brake roller 320 in the circumferential direction.

Accordingly, the brake roller 320 moves away from the wedge surface 312 of the brake plate 310 and at the same time compresses the elastic member 330 supported by the support block 314, thereby releasing the braking on the braking plate 310.

Subsequently, when the clutch plate 230 rotates, the force of the push block 234 pushing the brake roller 320 in the circumferential direction is applied to the support block 314 via the elastic member 330, thereby rotating the braking plate 310.

At the same time, the swivel plate 400 mounted on the braking plate 310 may transmit rotational force for swiveling to the seat while rotating together with the rotation of the braking plate 310.

Accordingly, when the swivel plate 400 rotates together with the rotation of the braking plate 310, the seat cushion frame 10 mounted on the swivel plate 400 also rotates, so that the seat may be swiveled.

In this way, the seat may be easily swiveled to a desired position for multi-party meetings and conversations, sleeping and resting, assistance in boarding and alighting, etc. in the limited interior space of the vehicle without interfering with surrounding components.

Meanwhile, during the swiveling of the seat, the brake device 300 may exert braking force so that the seat may accurately stop at a desired position without swaying or causing noise.

To this end, when the second motor 100 stops operating, the second eccentric shaft 104, the second middle gear 220, and the clutch plate 230 having the second upper gear 232 also stop.

Here, when the clutch plate 230 stops, the force pushing the brake roller 320 by the push block 234 is released, and thus compression pressing force on the elastic member 330 connected to the brake roller 320 is also released.

Accordingly, the brake roller 320 is pushed in the opposite direction by the elastic restoring force of the elastic member 330 and then is sandwiched between the wedge surface 312 of the braking plate 310 and the inner circumferential surface of the cylindrical portion 210-2 of the main body 210 so as to engage braking on the braking plate 310, thereby stopping the braking plate 310.

Therefore, due to the stoppage of the braking plate 310, the swivel plate 400 stacked and assembled thereon also stops, and the seat cushion frame 10 mounted on the swivel plate 400 also stops, thereby easily stopping the seat at a desired position while swiveling.

As such, when the seat is stopped during swiveling, the seat may be accurately stopped by the brake device at a desired position without swaying or causing noise, thereby improving the quality and performance of the swivel seat.

As is apparent from the above description, the present disclosure may provide the following effects.

First, the lifting device, the first reduction gear device, the first motor, and the swivel device are sequentially stacked to function as a monopost of the seat, and as such, a wide flattened space may be secured on the floor panel, thereby improving convenience for passengers staying inside the vehicle.

Second, only a height adjusting device that functions as a monopost is mounted at the bottom of the seat, or a height adjusting device and a swivel device that function as a monopost are stacked on the bottom of the seat, thereby providing only a seat height adjustment function, or providing both a seat height adjustment function and a swivel function.

Third, by allowing the lifting device to be operated by the output of the first reduction gear device upon operation of the first motor, the first motor, the first reduction gear device, the swivel device, and the seat may be lifted or lowered, preferably at the same time, thereby easily adjusting the height of the seat.

Fourth, when operating the swivel device, the seat may be easily rotated to a desired position for multi-party meetings and conversations, sleeping and resting, assistance in boarding and alighting, etc. in the limited interior space of the vehicle without interfering with surrounding components.

Fifth, when the seat is stopped during swiveling, the seat may be accurately stopped by the brake device at a desired position without swaying or causing noise, thereby improving the quality and performance of the swivel seat.

Although the present disclosure has been described in detail with reference to one embodiment, the scope of the present disclosure is not limited to the above-described embodiment, and various modifications and improvements by those skilled in the art based on the basic concept of the present disclosure as defined in the claims below will also be included in the scope of the present disclosure.

What is claimed is:

1. A device for height adjustment and swivel of a seat of a vehicle, the device comprising:

a first motor provided with a first eccentric shaft;

a first reduction gear device connected to the first eccentric shaft of the first motor;

a swivel device mounted between the first motor and a bottom of the seat and configured to swivel the seat; and a lifting device connected to the first reduction gear device and configured to lift or lower the first motor, the first reduction gear device, the swivel device, and the seat by eccentric rotational force of the first reduction gear device generated upon operation of the first motor.

2. The device according to claim 1, wherein the lifting device is configured to simultaneously raise or lower the first motor, the first reduction gear device, the swivel device, and the seat.

3. The device according to claim 1, wherein the lifting device, the first reduction gear device, the first motor, and the swivel device are sequentially stacked and are configured to form a monopost of the seat.

4. The device according to claim 1, wherein the first motor comprises:

a first motor body;

a first stator mounted on an inner circumferential portion of the first motor body; and a first rotor mounted on an outer circumferential surface of the first eccentric shaft and spaced apart from the first stator by a predetermined distance, and wherein the first eccentric shaft has an upper portion, which is a circular portion inserted into the first rotor, and has a lower portion, which is an eccentric portion configured to transmit eccentric rotational force to the first reduction gear device.

5. The device according to claim 4, wherein the first motor body has an upper portion and a lower portion having an upper motor cover or a lower motor cover, respectively, and configured to cover the first stator, the first rotor, and the first eccentric shaft.

6. The device according to claim 1, wherein the first reduction gear device comprises:

a first middle gear, which is an external gear eccentrically rotatably inserted into the first eccentric shaft;

an upper body having four corners each having formed in the four corners a first mounting hole, and having an inner circumferential portion provided on the upper body with a first upper gear partially engaged with the first middle gear; and a first lower gear having an inner circumferential portion provided on the first lower gear with an inner gear partially engaged with the first middle gear, and having an outer circumferential portion provided on the first lower gear with an outer gear configured to transmit rotational force to the lifting device, and wherein the first middle gear rotates eccentrically while being partially engaged with the first upper gear by the eccentric rotation of the first eccentric shaft, and at the same time, transmits rotational force acting in a direction opposite the eccentric rotation to the first lower gear.

7. The device according to claim 6, wherein:

a number of teeth on the inner gear of the first lower gear and a number of teeth on the first upper gear have a difference of at least one, and a number of teeth on the first middle gear is smaller than a larger number of teeth between the number of teeth on the inner gear of the first lower gear and the number of teeth on the first upper gear by at least two; and when the first eccentric shaft makes one revolution, the first lower gear receives rotational force from the first middle gear and rotates as much as the number of teeth on the inner gear of the first lower gear.

8. The device according to claim 6, wherein the lifting device comprises:

a base frame;

lead screws each mounted on a corresponding position at four corners of the base frame;

a lower body having four corners each having formed in the four corners a second mounting hole, and having a central portion provided with a cylindrical portion inserted into an inner circumferential portion of the first eccentric shaft;

lead nuts each rotatably mounted inside the first mounting hole in the upper body and inside the second mounting hole in the lower body, and into which a corresponding one of the lead screws is inserted; and nut gears each provided on an outer circumferential portion of a corresponding one of the lead nuts and engaged with the outer gear of the first lower gear.

9. The device according to claim 8, wherein the first mounting hole in the upper body has an inner circumferential portion and the second mounting hole in the lower body has an inner circumferential portion, and the inner circumferential portions have mounted in the inner circumferential portions a first bearing configured to guide rotation of the lead nut.

10. The device according to claim 8, wherein an outer circumferential portion of the cylindrical portion of the lower body and the inner circumferential portion of the first eccentric shaft have mounted therebetween a second bearing configured to guide rotation of the first eccentric shaft.

11. The device according to claim 8, wherein the base frame is fastened to a seat rail so as to be movable forwards and rearwards.

12. The device according to claim 1, wherein the swivel device comprises:

a second motor having a second eccentric shaft mounted to a bottom of the seat;

a second reduction gear device connected to the second eccentric shaft of the second motor;

a brake device configured to release braking by eccentric rotational force of the second reduction gear device when the second motor operates and configured to exert braking force to stop the seat when the second motor stops; and a swivel plate interconnected between the brake device and the seat cushion frame of the seat and configured to transmit rotational force for swiveling to the seat.

13. The device according to claim 12, wherein the second motor comprises:

a second motor body;

a second stator mounted on an inner circumferential portion of the second motor body;

a second rotor mounted on an outer circumferential surface of the second eccentric shaft and spaced apart from the second stator by a predetermined distance;

a motor cover mounted on a lower portion of the second motor body so as to cover the second stator, the second rotor, and the second eccentric shaft; and a third bearing mounted between a lower inner circumferential surface of the second eccentric shaft and an upper outer circumferential surface of the motor cover so as to guide rotation of the second eccentric shaft, and wherein the second eccentric shaft has a lower portion, which is a circular portion into which the second rotor is mounted, and has an upper portion, which is an eccentric portion configured to transmit eccentric rotational force to the second reduction gear device.

14. The device according to claim 12, wherein the second reduction gear device comprises:

a main body having an inner circumferential portion provided on the main body with a second lower gear and being stacked and assembled on the second motor body;

a clutch plate having a lower portion provided on the clutch plate with a second upper gear in a form of an inner gear and having an upper portion provided on the clutch plate with a plurality of push blocks for releasing braking of the brake device, and being rotatably inserted into the main body; and a second middle gear eccentrically rotatably inserted into the second eccentric shaft and partially engaged with both the second lower gear and the second upper gear, and wherein the second middle gear rotates eccentrically while being partially engaged with the second lower gear by the eccentric rotation of the second eccentric shaft, and at the same time, transmits rotational force acting in a direction opposite the eccentric rotation to the second upper gear of the clutch plate.

15. The device according to claim 14, wherein a number of teeth on the second lower gear and a number of teeth on the second lower gear have a difference of at least one, and a number of teeth on the second middle gear is smaller than a larger number of teeth between the number of teeth on the second lower gear and the number of teeth on the second upper gear by at least two.

16. The device according to claim 14, wherein, when the second eccentric shaft makes one revolution, the clutch plate receives rotational force from the second middle gear and rotates as much as the number of teeth on the second upper gear.

17. The device according to claim 14, wherein the brake device comprises:

a braking plate having an outer circumferential portion having formed on the braking plate a plurality of convex wedge surfaces at equal intervals in a circumferential direction thereof, being rotatably stacked on the clutch plate, and configured to transmit rotational force for swiveling to the swivel plate;

support blocks each protruding in a radial direction from a position between wedge surfaces of the brake plate, disposed between push blocks of the clutch plate, and having opposite surfaces each having formed in the opposite surfaces a support groove;

brake rollers each disposed between the push block and the support block;

elastic members each connected to the brake roller and supported compressively by the support block; and a fourth bearing configured to guide rotation of the swivel plate between an inner surface of an outer circumferential end of the swivel plate and an upper outer circumferential surface of the main body.

18. A vehicle comprising the device of claim 1.

19. A device for height adjustment and swivel of a seat of a vehicle, the device comprising:

a first motor provided with a first eccentric shaft, the first eccentric shaft including a hollow structure and upper and lower portions, the upper portion having a circular portion and the lower portion having an eccentric portion that is integrated with the circular portion;

a first reduction gear device connected to the first eccentric shaft of the first motor; and a lifting device connected to the first reduction gear device and configured to lift or lower the first motor, the first reduction gear device, and the seat by eccentric rotational force of the first reduction gear device generated upon operation of the first motor.

20. The device according to claim 19, further comprising a swivel device mounted between the first motor and a bottom of the seat and configured to swivel the seat.

* * * * *